US011637772B2

(12) United States Patent
Nallampatti Ekambaram et al.

(10) Patent No.: US 11,637,772 B2
(45) Date of Patent: Apr. 25, 2023

(54) MACHINE GENERATED CONTENT NAMING IN AN INFORMATION CENTRIC NETWORK

(71) Applicant: Intel Corporation, Santa Clara, CA (US)

(72) Inventors: Venkatesan Nallampatti Ekambaram, Hillsboro, OR (US); Satish Chandra Jha, Hillsboro, OR (US); Ned M. Smith, Beaverton, OR (US); S. M. Iftekharul Alam, Hillsboro, OR (US); Maria Ramirez Loaiza, Beaverton, OR (US); Yi Zhang, Portland, OR (US); Gabriel Arrobo Vidal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 701 days.

(21) Appl. No.: 16/457,480

(22) Filed: Jun. 28, 2019

(65) Prior Publication Data

US 2019/0327171 A1    Oct. 24, 2019

(51) Int. Cl.
*H04L 45/50* (2022.01)
*G06N 3/08* (2006.01)
*G06N 3/04* (2006.01)

(52) U.S. Cl.
CPC ............ *H04L 45/507* (2013.01); *G06N 3/04* (2013.01); *G06N 3/08* (2013.01)

(58) Field of Classification Search
CPC ........... H04L 45/507; G06N 3/04; G06N 3/08
See application file for complete search history.

(56) References Cited

U.S. PATENT DOCUMENTS

| 10,929,392 | B1* | 2/2021 | Cheng | .................. G06N 3/08 |
| 2005/0227676 | A1* | 10/2005 | De Vries | ................. H04L 29/06 |
| | | | | 455/414.1 |
| 2018/0121825 | A1* | 5/2018 | Kumar | ................... G06N 20/00 |

FOREIGN PATENT DOCUMENTS

CN          112149710         12/2020

OTHER PUBLICATIONS

Mochida, Torn, et al. "Naming scheme using NLP machine learning method for network weather monitoring system based on ICN." 2017 20th international symposium on wireless personal multimedia communications (WPMC). IEEE, 2017 (Year: 2017).*

Garcia, Daniel Hernández, et al. "Visual attention and object naming in humanoid robots using a bio-inspired spiking neural network." Robotics and Autonomous Systems 104 (2018): 56-71. (Year: 2018).*

(Continued)

*Primary Examiner* — Miranda M Huang
*Assistant Examiner* — Sidney Vincent Bostwick
(74) *Attorney, Agent, or Firm* — Schwegman Lundberg & Woessner, P.A.

(57) ABSTRACT

Systems and techniques for machine generation of content names in an information centric network (ICN) are described herein. For example, a node may obtain content. An inference engine may be invoked to produce a name for the content. Once the content is named, the node may respond to an interest packet that includes the name of the content. The response is a data packet that includes the content.

24 Claims, 4 Drawing Sheets (56) References Cited

OTHER PUBLICATIONS

Arshad, Sobia, et al. "Towards information-centric networking (ICN) naming for Internet of Things (IoT) the case of smart campus." Proceedings of the International Conference on Future Networks and Distributed Systems. 2017. (Year: 2017).*

"European Application Serial No. 20164638.7, Extended European Search Report dated May 29, 2020", 10 pgs.

Mochida, Torn, "Naming scheme using NLP machine learning method for network weather monitoring system based on ICN", 20th International Symposium on Wireless Personal Multimedia Communications (WPMC), IEEE, (Dec. 17, 2017), 428-434.

"European Application Serial No. 20164638.7, Communication Pursuant to Article 94(3) EPC dated Nov. 30, 2020", 9 pgs.

Zhang, "UCLA UCLA Electronic Theses and Dissertations Title NDNFit: An Open mHealth Application Built on Named Data Networking", (Dec. 31, 2018), 114 pgs.

"European Application Serial No. 20164638.7, Response filed Apr. 9, 2021 to Communication Pursuant to Article 94(3) EPC dated Nov. 30, 2020", 15 pgs.

"European Application Serial No. 20164638.7, Communication Pursuant to Article 94(3) EPC dated Apr. 29, 2022", 6 pgs.

"European Application Serial No. 20164638.7, Response filed Aug. 29, 22 to Communication Pursuant to Article 94(3) EPC dated Apr. 29, 2022", 9 pgs.

* cited by examiner

MACHINE GENERATED CONTENT NAMING IN AN INFORMATION CENTRIC NETWORK

TECHNICAL FIELD

Embodiments described herein generally relate to computer networking and more specifically to machine generation of content names in an information centric network (ICN).

BACKGROUND

ICN is an umbrella term for a new networking paradigm in which information itself is named and requested from the network instead of hosts (e.g., machines that provide information). To get content, a device requests named content from the network itself. The content request may be called an interest and transmitted via an interest packet. As the interest packet traverses network devices (e.g., routers), a record of the interest is kept. When a device that has content matching the name in the interest is encountered, that device may send a data packet in response to the interest packet. Typically, the data packet is tracked back through the network to the source by following the traces of the interest left in the network devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Naming data is an important aspect for ICNs that affects data access and delivery. Existing naming solutions are generally rule-based, with rules designed for particular scenarios or industries. Hierarchical naming or flat naming techniques may be employed to provide a predictable name given desired data. For example, to query a sensor, a location→time→type (e.g., "/home/14:00:00/temperature") hierarchy may be employed. Generally, the hierarchy moves from most significant parameter to least significant parameter. However, the determination of significance is often influenced by the envisioned deployment or operational scenario. Thus, the same data may be referenced by sensor, time, and location (e.g., type→time→location) when sensor readings generally are considered more significant than the location of the sensor.

Although a rule-based naming scheme generally works well within the context it was designed, it may not translate that well when used in other contexts. Thus, a sensor naming scheme for temperature data in an industrial context, may fit poorly when applied to the home. Because names form the basis of ICN routing, the naming scheme affects the performance and scalability of the network, such as forwarding efficiency, name space size, routing table size etc.

To address the issues noted above, a machine learning technique is described herein to name the data for efficient access based on various inputs, such as data content, type of requests received for the data, location, request originator etc. Such a naming technique may adapt to changing patterns of network use and improve efficiency in lookup and forwarding, reduce the routing table size, etc. Such a machine learned naming technique may also be beneficial by automating the naming process automated and efficient.

Figure 1:
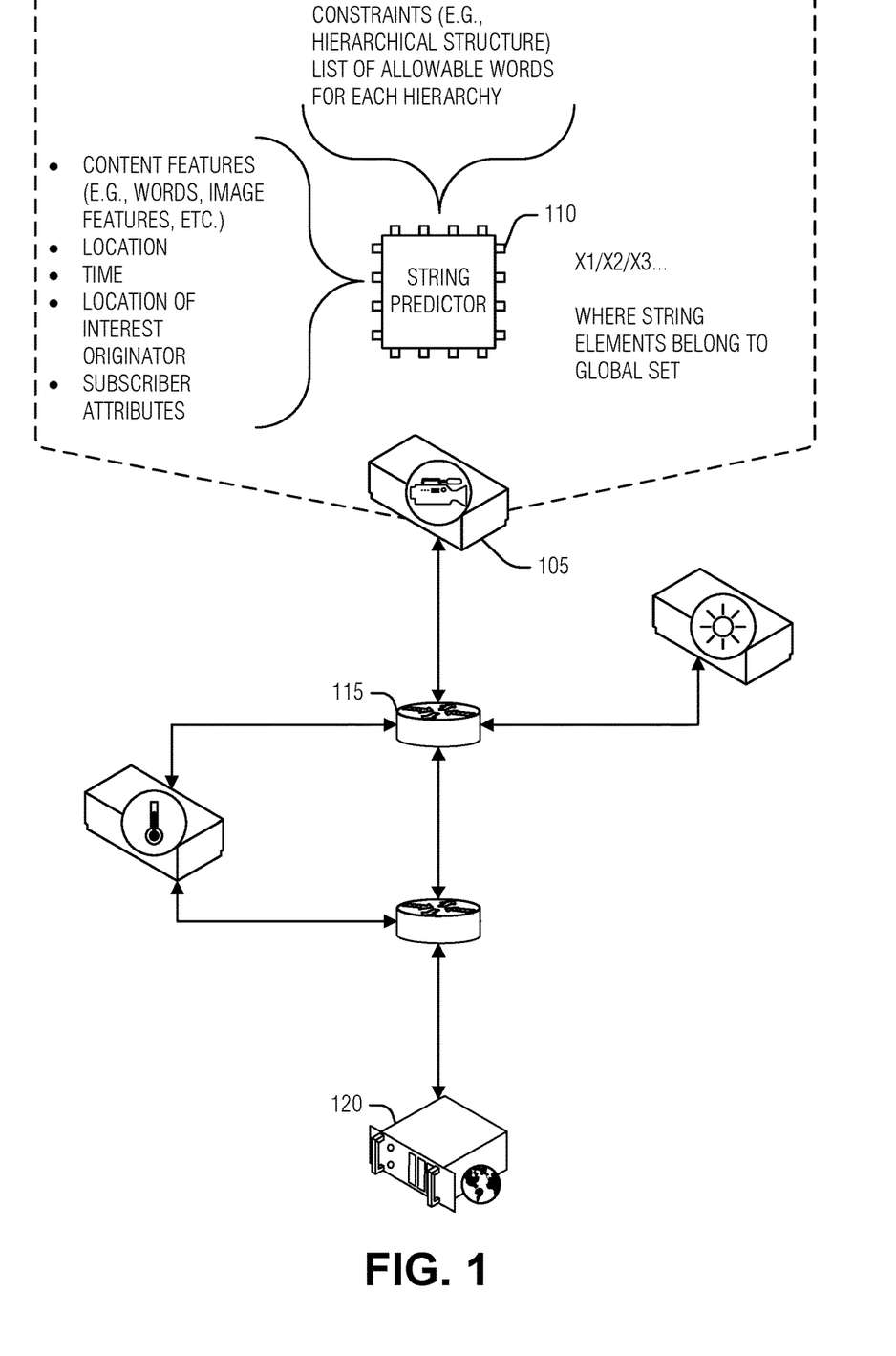
FIG. 1 illustrates an example of system including a string predictor to generate content names, according to an embodiment.

FIG. 1 illustrates an example of system including a string predictor 110 to generate content names, according to an embodiment. As illustrated, the string predictor 110 is located within a device 105, which is marked to provide video data. Other devices in the network include a thermostat and a lighting control device. The device 105 is connected to a subscriber device 120 via the ICN network 115.

As noted above, content naming may be a challenging problem. Existing naming techniques generally provide a structure for content naming (e.g. a hierarchical structure), however the onus is generally on the content producer (e.g., device 105) to provide a name. Here, the string predictor 110 implements a learning technique to determine a name for content based on various input features with optimization constraints. Thus, the string predictor 110, although illustrated as a component of the device 105, may also be implemented by a subscriber 120, or an ICN router 115.

To understand the string predictor's behavior, assume a scenario with an already adopted naming structure where the content name needs to be determined. For example, given a hierarchical naming scheme with a structure similar to the following examples:

1. /sports/soccer/player/Pele/ . . .
2. country/Brazil/state/MinasGerais/legend/Pele/ . . . As mentioned above, even under this hierarchical naming scheme, the same data may be represented by different names. Further, these different names may exist within the ICN 115, as each may be tailored to satisfy different interest originators (e.g., subscriber 120).

Instead of multi-named data, which may present problems with duplicate interests, duplicate caching, etc., the string predictor 110 integrates various metrics—such as the content itself (e.g., the sounds, text, images, bits, etc. that makeup the content), the interest originator (e.g., subscriber 120), locality of the device 105 or the subscriber 120, among other things—with optimization metrics—such as forwarding efficiency (e.g., name prefixes that provide good routing cues to the ICN router 115), the routing table size (e.g., how compact is the name), among other criteria.

In an example, the string predictor 110 includes an on-going learning engine that enables the content name to change over time. For example, the hierarchical named data noted above, interest packets for content on Pele may have a different origin or requirements depending on when Pele was active. Hence, the naming scheme for the data may have to adapt over time to ensure an efficient name from the network's perspective. Although various on-going learning technique may be used, spike timing dependent plasticity (STDP) techniques operating on neuromorphic hardware, or a spiking neural network, introduce an interesting option, especially for power constrained devices (e.g., remote sensors). Generally, STDP provides an inherent pattern matching facility over many samples. In contrast to traditional artificial neural network training—which generally optimize neuron connection weights to minimize the network's output with respect to a fitness function via a gradient descent technique—spiking neural networks self-organize around observable patterns. The training is largely based on selection of available patterns for output.

Because spiking neural networks employing STDP inherently migrate towards evident patterns, the spiking network will converge, over time, on a new naming pattern if the underlying inputs similarly change. Such an engine also generally provides excellent power consumption efficiency because power consumption is generally limited to active neurons. In contrast, traditional neural networks generally calculate the response from every neuron in the network regardless of that neuron's participation in any particular pattern recognition event.

In general, the string predictor 110 may implement any machine learning approach for string prediction. For example, the string predictor 110 may implement a Long-short-term memory (LSTM) based neural networks. In an example, the string predictor 110 does not implement a neural network, but rather a Bag-of-words model—which maps features (e.g., words) into an n-dimensional space to ascertain which a close to each other via Euclidean geometry—hierarchical Bayesian models, or other statistical methods.

The machine learning technique and subsequent inference engine implemented by the string predictor 110 may consider several different types of input to produce a name. In an example, the input includes content features (e.g. words of the documents, two-tuples, image features, hyperlinks, etc.). In an example, a feature extraction technique may be used to distill features from the content. Example feature extraction techniques may include scale invariant feature transform (SIFT) or speeded up robust features (SURF) for images, perceptual linear prediction (PLP), linear predictive codes (PLC), or Mel Frequency Cepstral Coefficients (MFCC) for audio features, etc.

The inference engine itself may be implemented in several different types of hardware. These may include stand-alone accelerators, neuromorphic hardware, neural computes sticks, etc.

In an example, the input may include a location of a content publisher (e.g., the device 105), time content was created or updated, locations of possible subscribers (e.g., subscriber 120)—such as may be determined from a history of previous interest or content names—e.g., from past history based on previous names), various subscriber attributes, among others. Many of these features may be used to tailor the name based on geography or time. For example, video footage may be called "film" in various geographical locations or at different points in time. Due to the extensive local caching nature of ICN, having geographically distinct names for the same content generally does not result in too much network overhead because the content will likely be cached close to the subscriber 120.

This leads to another aspect of the inference engine implemented by the string predictor 110, constraints on the name provided by the string predictor 110. For example, if a hierarchical naming structure is assumed, then there may be restrictions on content or length at any given level of the hierarchy. In an example, the string predictor orders possible names, or names at a given level of the hierarchy, and selects one that best matches an optimization criterion. For example, it is often beneficial if higher levels of the hierarchy are shorter to reduce forwarding interest base (FIB) routing tables in the router 115. Optimization criteria may include length, using a smaller character set (e.g., American Standard Code for Information Interchange (ASCII) vs. Unicode), more popular characters—this may lead to compression efficiencies under variable length compression codes—or human understanding (e.g., the name comprises words or abbreviations in a dictionary or other reference document, among others.

In an example, all names are generated by the string predictor 110. Thus, both the subscriber 120 and the device 110 rely on the string predictor 110 to generate the name. This leads to an interesting outcome in which the data name does not conform to any defined standard, but rather is predictable because every element uses the same element (e.g., the string predictor 110) to generate the names. In an example, a constraint on this type of name generation is a minimization in variance for a domain. Thus, for example, within a domain (e.g., home automation) similar names will result from this constraint, quite different names may be provided for similar content in a different domain (e.g., vehicle-to-vehicle communications). The advantage of this constraint includes more efficient routing within the domain.

Figure 2:
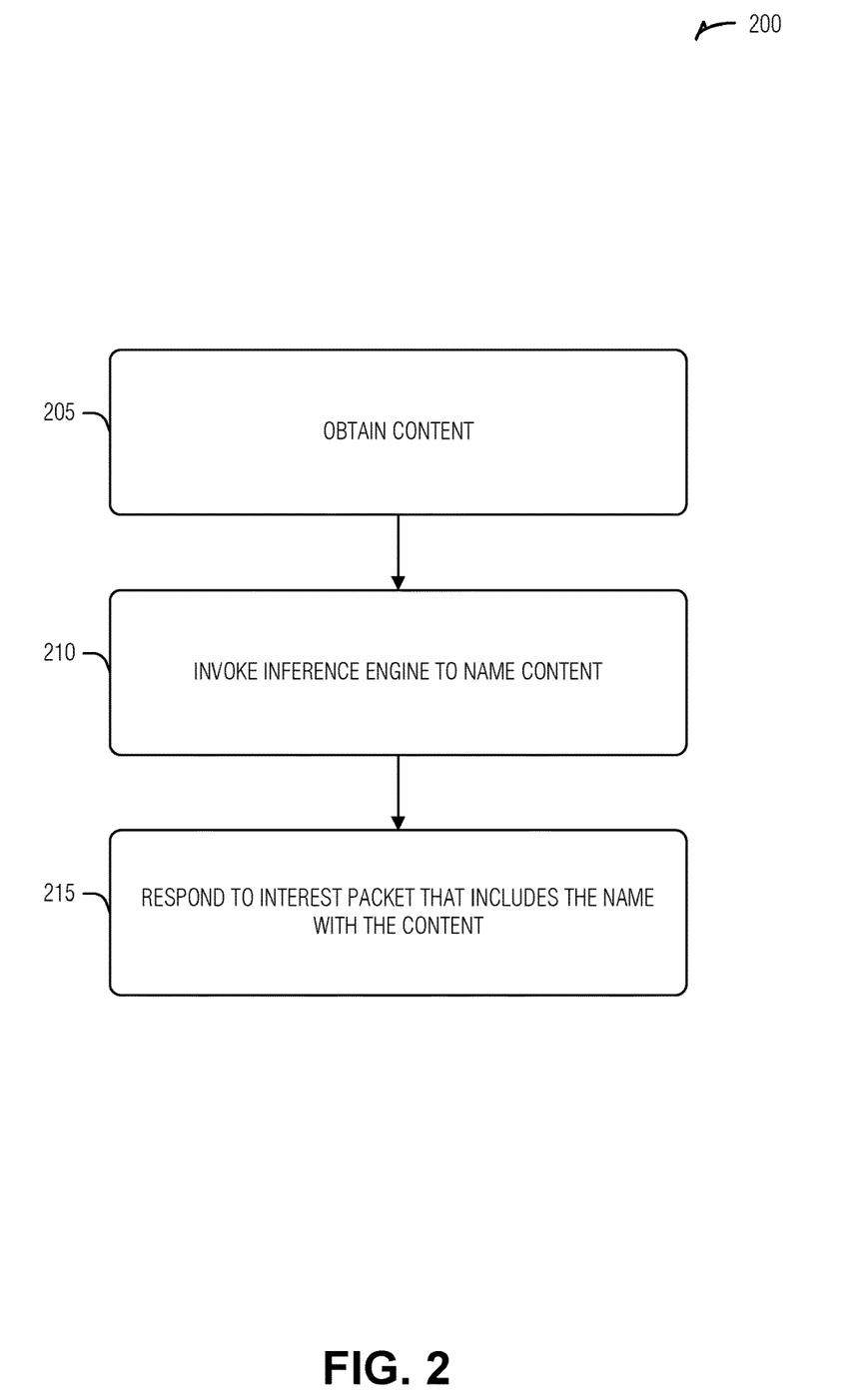
FIG. 2 is an example of a method for ICN approximate calculation caching, according to an embodiment.

FIG. 2 is an example of a method for ICN approximate calculation caching, according to an embodiment. The operations of the method 200 are implemented in computing hardware, such as that described in FIG. 3 or 4 (e.g., processing circuitry).

At operation 205, content is obtained. For example, an ICN layer of a sensing device (e.g., a motion sensor, thermometer, light sensor, etc.) may receive a portion of the sensor's output as content. Other examples of content may include the result of a function execution in function as a service (FAAS) implementations, or even a data packet received at an ICN router.

In an example, the method 200 includes obtaining a content feature set from the content. Here, a known process, such as those mentioned above, may be applied to the content to extract a feature vector, or other representation of the content. Such feature sets generally employ objective metrics of the content that tend to differentiate different items of content. Thus, a feature set may, for example, include a color analysis of an image which differentiates the image from other images.

In an example, other aspects of the content may be extracted as part of obtaining the content. For example, identification of a program or process that produced the content, an operating context in which the content was created, etc. This meta data of the content may be preserved for future name generation.

At operation 210, an inference engine is invoked to produce a name for the content. In an example, the inference engine is an artificial neural network. In an example, the artificial neural network is a spiking neural network that implement spike timing dependent plasticity (STDP) to train the spiking neural network while it is in operation. As mentioned above, such a network can both provide the name during an inference and continue to learn while in operation. For example, if the spiking neural network includes delivery observations as input, then the network will learn, over time, which of two different names for the same content is more popular. The network will then prefer to output a name for the content that conforms with the preferred name.

In an example, the artificial neural network is trained with a constraint that limits a form of the name. Here, the network error function used during training will optimize output that uniquely identifies the content and that meets the constraints. For example, different segments of the name may be used at different stages of ICN routing and name matching.

A constraint may limit, or seek to minimize, a size of a name segment, or limit the characters used to represent a particular segment because, for example, it will make storage or compression easier (e.g., for ICN routers, remotes caches, etc.). Thus, in an example, the constraint limits a size or content of part of the name to ensure more efficient routing in an ICN.

In an example, the inference engine does not employ an artificial neural network. Because the inference engine acts as a string predictor given the content, and possibly some other information, any such string predictor may be employed. For example, the inference engine may employ latent semantic analysis, a bag-of-words model, a hierarchical Bayesian model, a support vector machine, k-means clustering (where k represents an index of preselected values), etc.

In an example, the content feature set, if one is obtained with the content, is provided to the inference engine as part of the invocation of the inference engine. Here, the content feature set is a distinct unit of content features that are separate from whatever the inference engine may be trained upon. Thus, the inference engine may not accept the raw content as input, but rather uses the feature set to "know" the content. In an example, the inference engine may accept both the raw content and the feature set. Such a scenario may be useful when, for example, manipulating the feature set may provide an efficient way to steer the inference engine's results without having to employ extensive retraining (e.g., in the case of artificial neural networks) or redesign.

At operation 215, a response, which includes the content, is made to an interest packet that includes the name. Thus, the inference that the inference engine is performing is predicting which name will arrive for the content. In an example, the same inference engine (e.g., inference engines with the same design or training) is used at each node in an ICN to name the content. This may result in efficient naming that is not necessarily burdened by human design ideas, but rather molded by the operating conditions within which the content flows. In an example, the inference engine is specific to a domain within the ICN. Thus, different domains may maintain naming constraints without burdening other domains for which other names may be more appropriate.

In an example, the interest packet is received before the inference engine is invoked. Here, an attribute of the interest packet may be provided to the inference engine (e.g., operation 210) to produce the name. This enables the content provider to, for example, produce a name that is tailored to the interest packet originator. This may introduce some variety into the naming which may be harnessed by a learning technique to evolve towards more useful names. Thus, in an example, the attribute of the interest packet is at least one of an entity name that originated the interest packet or a location of an entity that originated the interest packet.

In an example, the attribute is a content feature set. This is an interesting variation in which the interest originator includes a fingerprint of the data it is looking for. This fingerprint may be generated off of "close" content already in the interest packet originator's possession or may be obtained from an index of the content. Using such a feature set of "close" content may result in similar content having similar names. This may be useful feature when, for example, close enough content is acceptable to the interest packet originator. Such scenarios may often be present when the interest packet originator uses reductionist technique, such as artificial neural network pattern matching to identify a face in an image.

Figure 3:
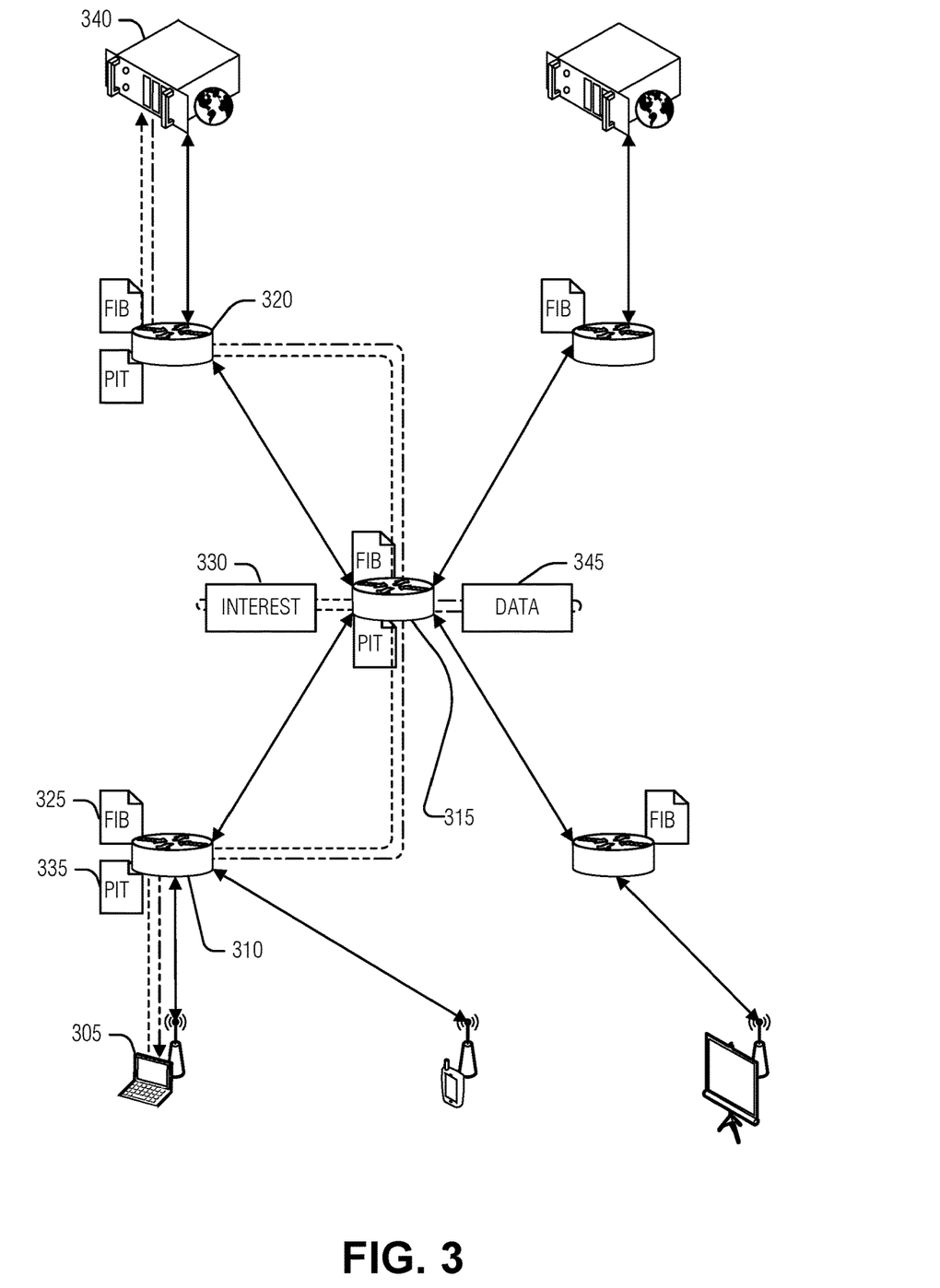
FIG. 3 illustrates an example ICN, according to an embodiment.
Figure 4:
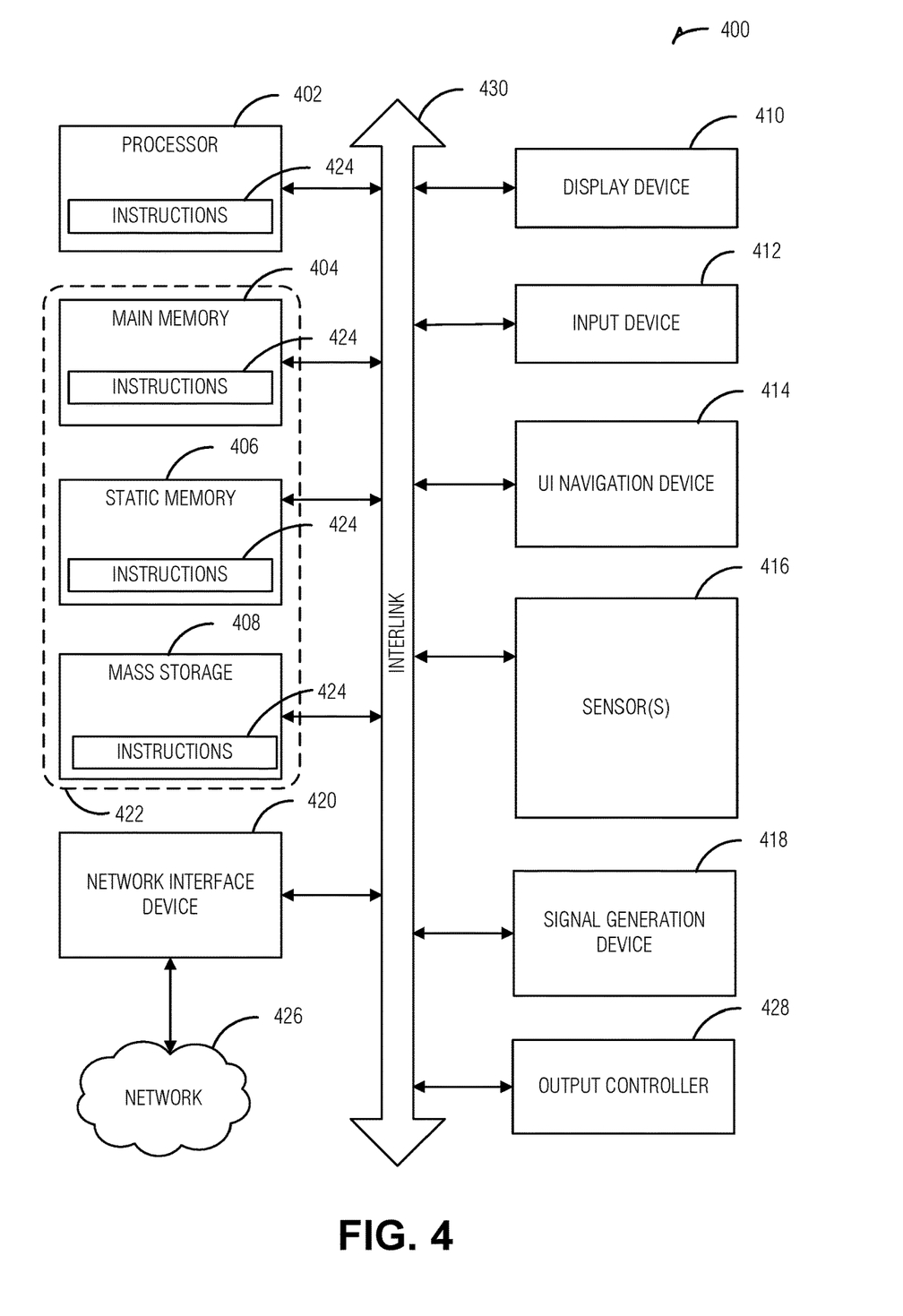
FIG. 4 is a block diagram illustrating an example of a machine upon which one or more embodiments may be implemented.

FIGS. 3 and 4 below provide additional details of the components in FIG. 1. For example, FIG. 3 illustrates several details and variations in ICNs. FIG. 4 illustrates several examples of computer hardware that can be used to implement any of the components illustrated in FIG. 1.

FIG. 3 illustrates an example ICN, according to an embodiment. ICNs operate differently than traditional host-based (e.g., address-based) communication networks. ICN is an umbrella term for a networking paradigm in which information itself is named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, a device 305 (e.g., subscriber) requests named content from the network itself. The content request may be called an interest and transmitted via an interest packet 330. As the interest packet traverses network devices (e.g., network elements, routers, switches, hubs, etc.)—such as network elements 310, 315, and 320—a record of the interest is kept, for example, in a pending interest table (PIT) at each network element. Thus, network element 310 maintains an entry in its PIT 335 for the interest packet 330, network element 315 maintains the entry in its PIT, and network element 320 maintains the entry in its PIT.

When a device, such as publisher 340, that has content matching the name in the interest packet 330 is encountered, that device 340 may send a data packet 345 in response to the interest packet 330. Typically, the data packet 345 is tracked back through the network to the source (e.g., device 305) by following the traces of the interest packet 330 left in the network element PITs. Thus, the PIT 335 at each network element establishes a trail back to the subscriber 305 for the data packet 345 to follow.

Matching the named data in an ICN may follow several strategies. Generally, the data is named hierarchically, such as with a universal resource identifier (URI). For example, a video may be named www.somedomain.com or videos or v8675309. Here, the hierarchy may be seen as the publisher, "www.somedomain.com," a sub-category, "videos," and the canonical identification "v8675309." As an interest 330 traverses the ICN, ICN network elements will generally attempt to match the name to a greatest degree. Thus, if an ICN element has a cached item or route for both "www-.somedomain.com or videos" and "www.somedomain.com or videos or v8675309," the ICN element will match the later for an interest packet 330 specifying "www.somedomain.com or videos or v8675309." In an example, an expression may be used in matching by the ICN device. For example, the interest packet may specify "www.somedomain.com or videos or v8675*" where '*' is a wildcard. Thus, any cached item or route that includes the data other than the wildcard will be matched.

Item matching involves matching the interest 330 to data cached in the ICN element. Thus, for example, if the data 345 named in the interest 330 is cached in network element 315, then the network element 315 will return the data 345 to the subscriber 305 via the network element 310. However, if the data 345 is not cached at network element 315, the network element 315 routes the interest 330 on (e.g., to network element 320). To facilitate routing, the network elements may use a forwarding information base 325 (FIB) to match named data to an interface (e.g., physical port) for the route. Thus, the FIB 325 operates much like a routing table on a traditional network device.

In an example, additional meta-data may be attached to the interest packet 330, the cached data, or the route (e.g., in the FIB 325), to provide an additional level of matching. For example, the data name may be specified as "www.some-domain.com or videos or v8675309," but also include a version number—or timestamp, time range, endorsement, etc. In this example, the interest packet 330 may specify the desired name, the version number, or the version range. The matching may then locate routes or cached data matching the name and perform the additional comparison of meta-data or the like to arrive at an ultimate decision as to whether data or a route matches the interest packet 330 for respectively responding to the interest packet 330 with the data packet 345 or forwarding the interest packet 330.

ICN has advantages over host-based networking because the data segments are individually named. This enables aggressive caching throughout the network as a network element may provide a data packet 330 in response to an interest 330 as easily as an original author 340. Accordingly, it is less likely that the same segment of the network will transmit duplicates of the same data requested by different devices.

Fine grained encryption is another feature of many ICN networks. A typical data packet 345 includes a name for the data that matches the name in the interest packet 330. Further, the data packet 345 includes the requested data and may include additional information to filter similarly named data (e.g., by creation time, expiration time, version, etc.). To address malicious entities providing false information under the same name, the data packet 345 may also encrypt its contents with a publisher key or provide a cryptographic hash of the data and the name. Thus, knowing the key (e.g., from a certificate of an expected publisher 340) enables the recipient to ascertain whether the data is from that publisher 340. This technique also facilitates the aggressive caching of the data packets 345 throughout the network because each data packet 345 is self-contained and secure. In contrast, many host-based networks rely on encrypting a connection between two hosts to secure communications. This may increase latencies while connections are being established and prevents data caching by hiding the data from the network elements.

Example ICN networks include: content centric networking (CCN)—as specified in the Internet Engineering Task Force (IETF) draft specifications for CCNx 0.x and CCN 1.x; named data networking (NDN)—as specified in the NDN technical report DND-0001; Data-Oriented Network Architecture (DONA)—as presented at proceedings of the 2007 Association for Computing Machinery's (ACM) Special Interest Group on Data Communications (SIGCOMM) conference on Applications, technologies, architectures, and protocols for computer communications; Named Functions Networking (NFN); 4WARD; Content Aware Searching, Retrieval and Streaming (COAST); Convergence of Fixed and Mobile Broadband Access/Aggregation Networks (COMBO); Content Mediator Architecture for Content-Aware Networks (COMET); CONVERGENCE; GreenICN; Network of Information (NetInf); IP Over ICN (POINT); Publish-Subscribe Internet Routing Paradigm (PSIRP); Publish Subscribe Internet Technology (PURSUIT); Scalable and Adaptive Internet Solutions (SAIL); Universal, Mobile-Centric and Opportunistic Communications Architecture (UMOBILE); among others.

FIG. 4 illustrates a block diagram of an example machine 400 upon which any one or more of the techniques (e.g., methodologies) discussed herein may perform. Examples, as described herein, may include, or may operate by, logic or a number of components, or mechanisms in the machine 400. Circuitry (e.g., processing circuitry) is a collection of circuits implemented in tangible entities of the machine 400 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 400 follow.

In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 400 may include a hardware processor 402 (e.g., a central processing unit (CPU), a graphics processing unit (GPU), a hardware processor core, or any combination thereof), a main memory 404, a static memory (e.g., memory or storage for firmware, microcode, a basic-input-output (BIOS), unified extensible firmware interface (UEFI), etc.) 406, and mass storage 408 (e.g., hard drive, tape drive, flash storage, or other block devices) some or all of which may communicate with each other via an interlink (e.g., bus) 430. The machine 400 may further include a display unit 410, an alphanumeric input device 412 (e.g., a keyboard), and a user interface (UI)

navigation device 414 (e.g., a mouse). In an example, the display unit 410, input device 412 and UI navigation device 414 may be a touch screen display. The machine 400 may additionally include a storage device (e.g., drive unit) 408, a signal generation device 418 (e.g., a speaker), a network interface device 420, and one or more sensors 416, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 402, the main memory 404, the static memory 406, or the mass storage 408 may be, or include, a machine readable medium 422 on which is stored one or more sets of data structures or instructions 424 (e.g., software) embodying or utilized by any one or more of the techniques or functions described herein. The instructions 424 may also reside, completely or at least partially, within any of registers of the processor 402, the main memory 404, the static memory 406, or the mass storage 408 during execution thereof by the machine 400. In an example, one or any combination of the hardware processor 402, the main memory 404, the static memory 406, or the mass storage 408 may constitute the machine readable media 422. While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine-readable medium examples may include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may be further transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software. A transmission medium is a machine readable medium.

Additional Notes & Examples

Example 1 is a device for machine generation of content names in an information centric network (ICN), the device comprising: processing circuitry; and a memory including instructions that, when executed by the processing circuitry, configure the processing circuitry to: obtain content; invoke an inference engine to produce a name for the content; and respond to an interest packet that includes the name with a data packet that includes the content.

In Example 2, the subject matter of Example 1, wherein the interest packet is received before the inference engine is invoked, and wherein an attribute of the interest packet was provided to the inference engine to produce the name.

In Example 3, the subject matter of Example 2, wherein the attribute of the interest packet is at least one of an entity name that originated the interest packet or a location of an entity that originated the interest packet.

In Example 4, the subject matter of any of Examples 2-3, wherein the attribute is a content feature set.

In Example 5, the subject matter of any of Examples 1-4, wherein the instructions configure the processing circuitry to: obtain a content feature set from the content; and provide the content feature set to the inference engine as part of the invocation of the inference engine.

In Example 6, the subject matter of any of Examples 1-5, wherein the inference engine is an artificial neural network.

In Example 7, the subject matter of Example 6, wherein the artificial neural network is a spiking neural network that implement spike timing dependent plasticity (STDP) to train the spiking neural network while it is in operation.

In Example 8, the subject matter of any of Examples 6-7, wherein the artificial neural network is trained with a constraint that limits a form of the name.

In Example 9, the subject matter of Example 8, wherein the constraint limits a size or content of part of the name to ensure more efficient routing in an ICN.

In Example 10, the subject matter of any of Examples 1-9, wherein the inference engine does not employ an artificial neural network.

In Example 11, the subject matter of Example 10, wherein the inference engine is one of a bag-of-words engine or a hierarchical Bayesian model.

In Example 12, the subject matter of any of Examples 1-11, wherein the inference engine is used at each node in an ICN to name the content.

In Example 13, the subject matter of Example 12, wherein the inference engine is specific to a domain within the ICN.

Example 14 is a method for machine generation of content names in an information centric network (ICN), the method comprising: obtaining content; invoking an inference engine to produce a name for the content; and responding to an interest packet that includes the name with a data packet that includes the content.

In Example 15, the subject matter of Example 14, wherein the interest packet is received before the inference engine is invoked, and wherein an attribute of the interest packet was provided to the inference engine to produce the name.

In Example 16, the subject matter of Example 15, wherein the attribute of the interest packet is at least one of an entity name that originated the interest packet or a location of an entity that originated the interest packet.

In Example 17, the subject matter of any of Examples 15-16, wherein the attribute is a content feature set.

In Example 18, the subject matter of any of Examples 14-17, comprising: obtaining a content feature set from the content; and providing the content feature set to the inference engine as part of the invocation of the inference engine.

In Example 19, the subject matter of any of Examples 14-18, wherein the inference engine is an artificial neural network.

In Example 20, the subject matter of Example 19, wherein the artificial neural network is a spiking neural network that implement spike timing dependent plasticity (STDP) to train the spiking neural network while it is in operation.

In Example 21, the subject matter of any of Examples 19-20, wherein the artificial neural network is trained with a constraint that limits a form of the name.

In Example 22, the subject matter of Example 21, wherein the constraint limits a size or content of part of the name to ensure more efficient routing in an ICN.

In Example 23, the subject matter of any of Examples 14-22, wherein the inference engine does not employ an artificial neural network.

In Example 24, the subject matter of Example 23, wherein the inference engine is one of a bag-of-words engine or a hierarchical Bayesian model.

In Example 25, the subject matter of any of Examples 14-24, wherein the inference engine is used at each node in an ICN to name the content.

In Example 26, the subject matter of Example 25, wherein the inference engine is specific to a domain within the ICN.

Example 27 is at least one machine-readable medium including instructions for machine generation of content names in an information centric network (ICN), the instructions, when executed by processing circuitry, cause the processing circuitry to perform operations comprising: obtaining content; invoking an inference engine to produce a name for the content; and responding to an interest packet that includes the name with a data packet that includes the content.

In Example 28, the subject matter of Example 27, wherein the interest packet is received before the inference engine is invoked, and wherein an attribute of the interest packet was provided to the inference engine to produce the name.

In Example 29, the subject matter of Example 28, wherein the attribute of the interest packet is at least one of an entity name that originated the interest packet or a location of an entity that originated the interest packet.

In Example 30, the subject matter of any of Examples 28-29, wherein the attribute is a content feature set.

In Example 31, the subject matter of any of Examples 27-30, wherein the operations comprise: obtaining a content feature set from the content; and providing the content feature set to the inference engine as part of the invocation of the inference engine.

In Example 32, the subject matter of any of Examples 27-31, wherein the inference engine is an artificial neural network.

In Example 33, the subject matter of Example 32, wherein the artificial neural network is a spiking neural network that implement spike timing dependent plasticity (STDP) to train the spiking neural network while it is in operation.

In Example 34, the subject matter of any of Examples 32-33, wherein the artificial neural network is trained with a constraint that limits a form of the name.

In Example 35, the subject matter of Example 34, wherein the constraint limits a size or content of part of the name to ensure more efficient routing in an ICN.

In Example 36, the subject matter of any of Examples 27-35, wherein the inference engine does not employ an artificial neural network.

In Example 37, the subject matter of Example 36, wherein the inference engine is one of a bag-of-words engine or a hierarchical Bayesian model.

In Example 38, the subject matter of any of Examples 27-37, wherein the inference engine is used at each node in an ICN to name the content.

In Example 39, the subject matter of Example 38, wherein the inference engine is specific to a domain within the ICN.

Example 40 is a system for machine generation of content names in an information centric network (ICN), the system comprising: means for obtaining content; means for invoking an inference engine to produce a name for the content; and means for responding to an interest packet that includes the name with a data packet that includes the content.

In Example 41, the subject matter of Example 40, wherein the interest packet is received before the inference engine is invoked, and wherein an attribute of the interest packet was provided to the inference engine to produce the name.

In Example 42, the subject matter of Example 41, wherein the attribute of the interest packet is at least one of an entity name that originated the interest packet or a location of an entity that originated the interest packet.

In Example 43, the subject matter of any of Examples 41-42, wherein the attribute is a content feature set.

In Example 44, the subject matter of any of Examples 40-43, comprising: means for obtaining a content feature set from the content; and means for providing the content feature set to the inference engine as part of the invocation of the inference engine.

In Example 45, the subject matter of any of Examples 40-44, wherein the inference engine is an artificial neural network.

In Example 46, the subject matter of Example 45, wherein the artificial neural network is a spiking neural network that implement spike timing dependent plasticity (STDP) to train the spiking neural network while it is in operation.

In Example 47, the subject matter of any of Examples 45-46, wherein the artificial neural network is trained with a constraint that limits a form of the name.

In Example 48, the subject matter of Example 47, wherein the constraint limits a size or content of part of the name to ensure more efficient routing in an ICN.

In Example 49, the subject matter of any of Examples 40-48, wherein the inference engine does not employ an artificial neural network.

In Example 50, the subject matter of Example 49, wherein the inference engine is one of a bag-of-words engine or a hierarchical Bayesian model.

In Example 51, the subject matter of any of Examples 40-50, wherein the inference engine is used at each node in an ICN to name the content.

In Example 52, the subject matter of Example 51, wherein the inference engine is specific to a domain within the ICN.

Example 53 is at least one machine-readable medium including instructions that, when executed by processing circuitry, cause the processing circuitry to perform operations to implement of any of Examples 1-52.

Example 54 is an apparatus comprising means to implement of any of Examples 1-52.

Example 55 is a system to implement of any of Examples 1-52.

Example 56 is a method to implement of any of Examples 1-52.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A device for machine generation of content names in an information centric network (ICN), the device comprising:
    processing circuitry; and
    a memory including instructions that, when executed by the processing circuitry, configure the processing circuitry to:
        obtain content;
        invoke a first inference engine with a spiking neural network to implement a string predictor that produces a name for the content, the spiking neural network implemented with spike timing dependent plasticity (STDP) learning to train the spiking neural network in an on-going manner to adapt the name over time, wherein the name generated by the string predictor does not conform to any defined standard; and
        respond to an interest packet that includes the name with a data packet that includes the content, the name in the interest packet generated with a second inference engine at a subscriber device that created the interest packet, wherein the second inference engine uses another spiking neural network trained as the spiking neural network of the first inference engine to implement the string predictor, and wherein the device is a publisher device.

2. The device of claim 1, wherein the interest packet is received before the inference engine is invoked, and wherein an attribute of the interest packet was provided to the inference engine to produce the name.

3. The device of claim 2, wherein the attribute of the interest packet is at least one of an entity name that originated the interest packet or a location of an entity that originated the interest packet.

4. The device of claim 2, wherein the attribute is a content feature set.

5. The device of claim 1, wherein the spiking neural network is trained with a constraint that limits a form of the name.

6. A method for machine generation of content names in an information centric network (ICN), the method comprising:
    obtaining content at a first device, wherein the first device is a publisher device;
    invoking, by the first device, a first inference engine with a spiking neural network to implement a string predictor that produces a name for the content, the spiking neural network implemented with spike timing dependent plasticity (STDP) learning to train the spiking neural network in an on-going manner to adapt the name over time, wherein the name generated by the string predictor does not conform to any defined standard; and
    responding, by the first device, to an interest packet that includes the name with a data packet that includes the content, the name in the interest packet generated by a second device, using a second inference engine, that created the interest packet, wherein the second inference engine uses another spiking neural network trained as the spiking neural network to implement the string predictor, and wherein the second device is a subscriber device.

7. The method of claim 6, wherein the interest packet is received before the inference engine is invoked, and wherein an attribute of the interest packet was provided to the inference engine to produce the name.

8. The method of claim 7, wherein the attribute of the interest packet is at least one of an entity name that originated the interest packet or a location of an entity that originated the interest packet.

9. The method of claim 7, wherein the attribute is a content feature set.

10. The method of claim 6, wherein the spiking neural network is trained with a constraint that limits a form of the name.

11. At least one non-transitory machine-readable medium including instructions for machine generation of content names in an information centric network (ICN), the instructions, when executed by processing circuitry of a first device, cause the processing circuitry to perform operations comprising:
obtaining content;
invoking a first inference engine with a spiking neural network to implement a string predictor that produces a name for the content, the spiking neural network implemented with spike timing dependent plasticity (STDP) learning to train the spiking neural network in an on-going manner to adapt the name over time, wherein the name generated by the string predictor does not conform to any defined standard; and
responding to an interest packet that includes the name with a data packet that includes the content, the name in the interest packet generated by a second device, using a second inference engine, that created the interest packet, wherein the second inference engine uses another spiking neural network trained as the spiking neural network to implement the string predictor, wherein the second device is a subscriber device, and wherein the first device is a publisher device.

12. The at least one non-transitory machine-readable medium of claim 11, wherein the interest packet is received before the inference engine is invoked, and wherein an attribute of the interest packet was provided to the inference engine to produce the name.

13. The at least one non-transitory machine-readable medium of claim 12, wherein the attribute of the interest packet is at least one of an entity name that originated the interest packet or a location of an entity that originated the interest packet.

14. The at least one non-transitory machine-readable medium of claim 12, wherein the attribute is a content feature set.

15. The at least one non-transitory machine-readable medium of claim 11, wherein the spiking neural network is trained with a constraint that limits a form of the name.

16. The device of claim 5, wherein the constraint limits a size or content of part of the name to ensure more efficient routing in the ICN.

17. The device of claim 1, wherein the instructions configure the processing circuitry to:
receive a content feature of the content in addition to the content; and
provide the content feature set to the inference engine as part of the invocation of the inference engine.

18. The method of claim 6, wherein the constraint limits a size or content of part of the name to ensure more efficient routing in an ICN.

19. The method of claim 6, comprising:
receiving a content feature of the content in addition to the content; and
providing the content feature set to the inference engine as part of the invocation of the inference engine.

20. The at least one non-transitory machine-readable medium of claim 11, wherein the constraint limits a size or content of part of the name to ensure more efficient routing in an ICN.

21. The at least one non-transitory machine-readable medium of claim 11, wherein the operations comprise:
receiving a content feature of the content in addition to the content; and
providing the content feature set to the inference engine as part of the invocation of the inference engine.

22. The device of claim 1, wherein the device is part of a system that includes the different device, and wherein the different devices includes:
second processing circuitry; and
a second memory including second instructions that, when executed by the second processing circuitry, configure the second processing circuitry to:
invoke the copy of the inference engine to produce the name for the content;
create the interest packet with the name to request the content; and
transmit the interest packet.

23. The method of claim 6, comprising:
invoking, by the second device, the copy of the inference engine to produce the name for the content;
creating, by the second device, the interest packet with the name to request the content; and
transmitting, by the second device, the interest packet.

24. The at least one non-transitory machine-readable medium of claim 11, wherein the first device is part of a system that includes the second device, and wherein the second device includes
a second at least one non-transitory machine readable medium including second instructions that, when executed by second processing circuitry, cause the second processing circuitry to perform operations comprising:
invoking the copy of the inference engine to produce the name for the content;
creating the interest packet with the name to request the content; and
transmitting the interest packet.

* * * * *